United States Patent
Suefuji

(10) Patent No.: US 12,496,811 B2
(45) Date of Patent: Dec. 16, 2025

(54) RUBBER PRODUCT AND METHOD OF PRODUCING SAME

(71) Applicant: THE YOKOHAMA RUBBER CO., LTD., Hiratsuka (JP)

(72) Inventor: Ryotaro Suefuji, Kanagawa (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 0 days.

(21) Appl. No.: 18/998,279

(22) PCT Filed: Apr. 25, 2023

(86) PCT No.: PCT/JP2023/016299
§ 371 (c)(1),
(2) Date: Jan. 24, 2025

(87) PCT Pub. No.: WO2024/038644
PCT Pub. Date: Feb. 22, 2024

(65) Prior Publication Data
US 2025/0262845 A1    Aug. 21, 2025

(30) Foreign Application Priority Data
Aug. 18, 2022  (JP) .................................. 2022-130666

(51) Int. Cl.
*B32B 25/10* (2006.01)
*B29C 35/02* (2006.01)
(Continued)

(52) U.S. Cl.
CPC .............. *B32B 25/10* (2013.01); *B29C 35/02* (2013.01); *B29C 70/22* (2013.01); *B29C 70/30* (2013.01);
(Continued)

(58) Field of Classification Search
CPC ... B32B 25/10; B32B 1/08; B32B 2262/0276; B32B 2307/54; B32B 2307/72;
(Continued)

(56) References Cited

U.S. PATENT DOCUMENTS

| 5,595,284 A * | 1/1997 | Takahashi .............. D02G 3/447 198/847 |
| 9,365,992 B2 | 6/2016 | Yamada et al. |

(Continued)

FOREIGN PATENT DOCUMENTS

| JP | S54-39898 U | 3/1979 |
| JP | H10-157016 A | 6/1998 |

(Continued)

OTHER PUBLICATIONS

PCT/ISA/210 from International Application PCT/2023/016299 with the English translation thereof.

(Continued)

*Primary Examiner* — Michael C Miggins
(74) *Attorney, Agent, or Firm* — Carrier, Shende & Associates P.C.; Joseph P. Carrier; Fulchand P. Shende

(57) ABSTRACT

A rubber product that includes a cylindrical molded body having a plurality of reinforcing layers coaxially layered between inner and outer layers. In producing/vulcanizing the molded body, a rubber product including a cylindrical portion, each of multiple reinforcing layers composed of cord fabrics including a large number of fiber cords aligned and subjected to a predetermined adhesion treatment and coating rubber layers covering both surfaces of the cord fabric, and a bias structure in which the fiber cords of the reinforcing layers extend in an intersecting direction is formed. Each of the cord fabrics has: a tensile strength of ≥4320 N/cm in a cord extension direction and a weight of ≤950 g/m², each of the cord fabrics has a bending hardness of ≤30 g/cm after the (Continued)

predetermined adhesion treatment, and each of the coating rubber layers has a layer thickness of ≥0.2 mm and ≤1 mm.

8 Claims, 11 Drawing Sheets

(51) Int. Cl.
| | |
|---|---|
| *B29C 70/22* | (2006.01) |
| *B29C 70/30* | (2006.01) |
| *B29K 7/00* | (2006.01) |
| *B29K 9/06* | (2006.01) |
| *B29K 267/00* | (2006.01) |
| *B32B 1/08* | (2006.01) |

(52) U.S. Cl.
CPC ............ *B32B 1/08* (2013.01); *B29K 2007/00* (2013.01); *B29K 2009/06* (2013.01); *B29K 2267/00* (2013.01); *B32B 2262/0276* (2013.01); *B32B 2307/54* (2013.01); *B32B 2307/72* (2013.01); *B32B 2307/7376* (2023.05); *B32B 2319/00* (2013.01); *B32B 2597/00* (2013.01)

(58) Field of Classification Search
CPC ........ B32B 2307/7376; B32B 2319/00; B32B 2597/00; B29C 35/02; B29C 70/22; B29C 70/30; B29K 2007/00; B29K 2009/06; B29K 2267/00
See application file for complete search history.

(56) References Cited

U.S. PATENT DOCUMENTS

| | | | |
|---|---|---|---|
| 11,486,108 B2 | 11/2022 | Tsuchiya | |
| 2015/0091226 A1* | 4/2015 | Yamada | .................... E02B 3/26 |
| | | | 267/140 |
| 2016/0194064 A1 | 7/2016 | Okuno | |

FOREIGN PATENT DOCUMENTS

| | | |
|---|---|---|
| JP | 2013-231297 A | 11/2013 |
| JP | 2014-121806 A | 7/2014 |
| JP | 2019-119320 A | 7/2019 |
| JP | 2020-111893 A | 7/2020 |

OTHER PUBLICATIONS

PCT/ISA/237 from International Application PCT/2023/016299 with the English translation thereof.

* cited by examiner

RUBBER PRODUCT AND METHOD OF PRODUCING SAME

TECHNICAL FIELD

The present invention relates to a rubber product and a method of producing the same and particularly relates to a rubber product including a cylindrical portion in which a plurality of reinforcing layers are coaxially layered and embedded between an inner layer and an outer layer and a method of producing the same.

BACKGROUND ART

A reinforcing layer is embedded in a cylindrical portion of a rubber product such as a pneumatic fender or a marine hose. The reinforcing layer is embedded to resist internal pressure acting on the rubber product. For example, a reinforcing layer composed of a cord fabric having a large number of aligned fiber cords and coating rubber layers covering both surfaces of the cord fabric is used (see Patent Document 1). In general, a plurality of reinforcing layers are layered and embedded between an inner layer and an outer layer of a cylindrical portion, and fiber cords of the reinforcing layers layered adjacently extend in intersecting directions (so-called bias structure). The coating rubber layer interposed between the cord fabrics layered adjacently is set at an appropriate layer thickness for ensuring sufficient joining strength.

If the number of the layered reinforcing layers embedded in the cylindrical portion is increased to resist larger internal pressure, the time required for a layering operation of the reinforcing layers becomes longer, which is disadvantageous in improving productivity of the rubber product. The increase in number of the layered reinforcing layers results in an increase in weight, which is a cause of a deterioration in molding processability. An excessively large layer thickness of the coating rubber layer results in deteriorated molding processability. On the other hand, an excessively small layer thickness of the coating rubber layer causes insufficient joining strength between the reinforcing layers and joining strength between the reinforcing layer and an adjacent member, which is disadvantageous in ensuring sufficient pressure resistance. Therefore, there is room for improvement in improving productivity by reducing the number of the layered reinforcing layers embedded in the cylindrical portion while ensuring sufficient pressure resistance against the internal pressure, and in suppressing a deterioration in molding processability.

CITATION LIST

Patent Document

Patent Document 1: JP 10-157016 A

SUMMARY OF INVENTION

Technical Problem

A main object of the present invention is to provide a rubber product that can improve productivity by reducing the number of layered reinforcing layers embedded in a cylindrical portion while ensuring sufficient pressure resistance against internal pressure, and that can suppress a deterioration in molding processability, and a method of producing the rubber product.

Solution to Problem

To achieve the object described above, a rubber product according to an embodiment of the present invention is a rubber product including a cylindrical portion in which a plurality of reinforcing layers are coaxially layered and embedded between an inner layer and an outer layer, each of the reinforcing layers being composed of cord fabrics that include a large number of fiber cords aligned and is subjected to a predetermined adhesion treatment and coating rubber layers covering both surfaces of the cord fabric, and having a bias structure in which the fiber cords of the reinforcing layers extend in an intersecting direction. Each of the cord fabrics having specifications: a tensile strength of 4320 N/cm or more in an extension direction in which the fiber cords extend and a weight of 950 g/m$^2$ or less may be used, each of the cord fabrics may have a bending hardness of 30 g/cm or less after the predetermined adhesion treatment, and each of the coating rubber layers may have a layer thickness of 0.2 mm or more and 1 mm or less in a neutral state where the cylindrical portion is not expanded.

A method of producing a rubber product according to an embodiment of the present invention is a method of producing a rubber product including molding a molded body having a cylindrical shape in which a plurality of reinforcing layers are coaxially layered between an inner layer and an outer layer, composing each of the reinforcing layers of cord fabrics that include a large number of fiber cords aligned and is subjected to a predetermined adhesion treatment and coating rubber layers covering both surfaces of the cord fabric, forming a bias structure in which the fiber cords of each of the reinforcing layers extend in an intersecting direction, and producing, by vulcanizing the molded body, a rubber product including a cylindrical portion in which the plurality of reinforcing layers are coaxially layered and embedded between the inner layer and the outer layer. The method may include using each of the cord fabrics having specifications: a tensile strength of 4320 N/cm or more in an extension direction of the fiber cords and a weight of 950 g/m$^2$ or less may be used, making each of the cord fabrics have a bending hardness of 30 g/cm or less after the predetermined adhesion treatment, and making each of the coating rubber layers have a layer thickness of 0.2 mm or more and 1 mm or less.

Advantageous Effects of Invention

According to an embodiment of the present invention, the cord fabric having a specification: a tensile strength of 4320 N/cm or more in the direction in which the fiber cords extend is used as each of the cord fabrics, sufficient pressure resistance against internal pressure acting on the rubber product can be easily ensured even when the number of the layered reinforcing layers embedded in the cylindrical portion is reduced. In turn, it is advantageous in improvement in productivity of the rubber product. Each of the cord fabrics has a weight of 950 g/m$^2$ or less and a bending hardness of 30 g/cm or less after the predetermined adhesion treatment, which is advantageous in suppressing a deterioration in molding processability when producing the rubber product. Further, when each of the coating rubber layers has a layer thickness of 0.2 mm or more and 1 mm or less, it becomes easy to ensure sufficient joining strength while suppressing an increase in weight, which is more advantageous in ensuring pressure resistance while suppressing a deterioration in molding processability.

DESCRIPTION OF EMBODIMENTS

Figure 1:
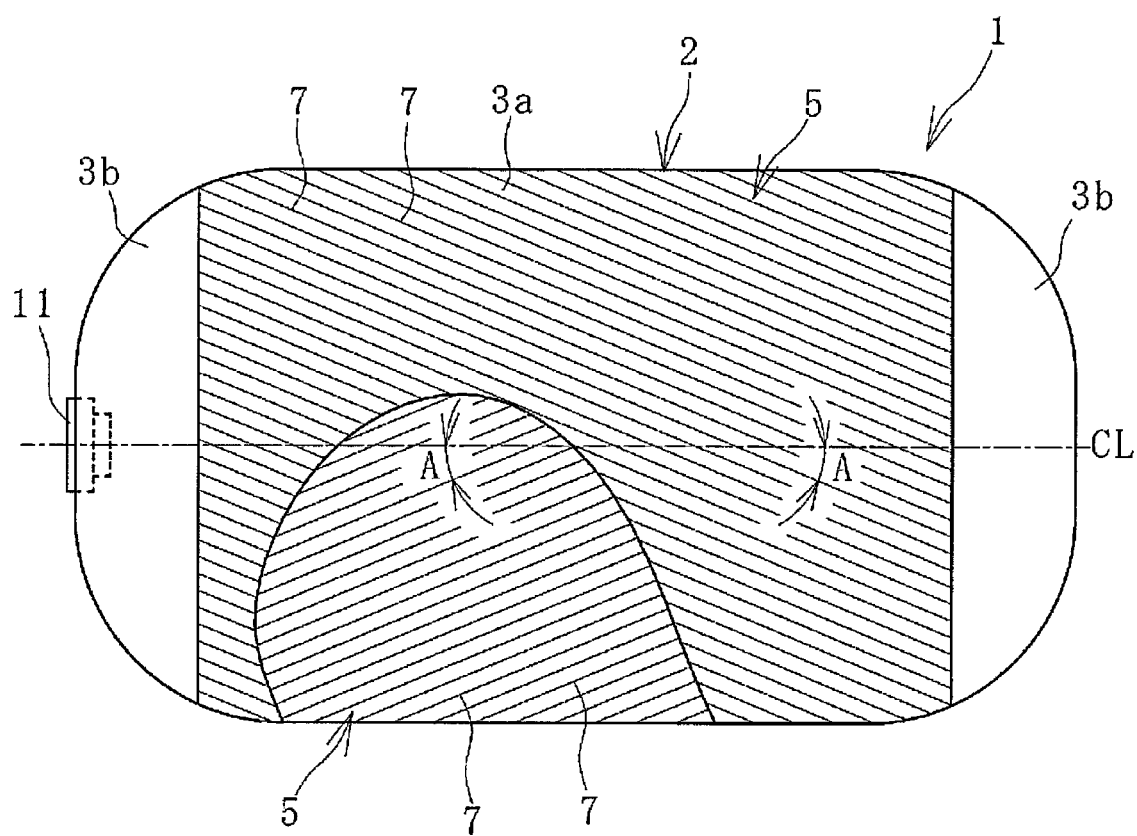
FIG. 1 is an explanatory diagram illustrating, in a side view, a pneumatic fender as an embodiment of a rubber product in a neutral state where a cylindrical portion is not expanded, with the cylindrical portion being partially cut away.

A rubber product according to an embodiment of the present invention and a method of producing the same will be described below with reference to the drawings by taking a case where the rubber product is a pneumatic fender as an example.

A pneumatic fender 1 (hereinafter referred to as fender 1) according to an embodiment of a rubber product illustrated in FIGS. 1 to 3 includes: a body 2 including hemispherical portions 3b connected to both ends of a cylindrical portion 3a; and a mouthpiece portion 11 provided on the body 2. In this embodiment, the mouthpiece portion 11 is provided on one of the hemispherical portions 3b, but may be provided on the hemispherical portions 3b on both sides. A one dot chain line CL in the drawing indicates a cylinder axial center of the cylindrical portion 3a, and a direction in which the one dot chain line CL extends is a cylinder axial direction.

In the cylindrical portion 3a, a plurality of cylindrical reinforcing layers 5 are coaxially layered and embedded between a cylindrical inner layer 4 and a cylindrical outer layer 10, and six reinforcing layers 5 are layered in this embodiment. That is, in the cylindrical portion 3a, the inner layer 4, the respective reinforcing layers 5, and the outer layer 10 are coaxially layered. The number of the layered reinforcing layers 5 is determined by pressure resistance against internal pressure required of the fender 1, and is, for example, approximately 4 or more and 12 or less.

Figure 4:
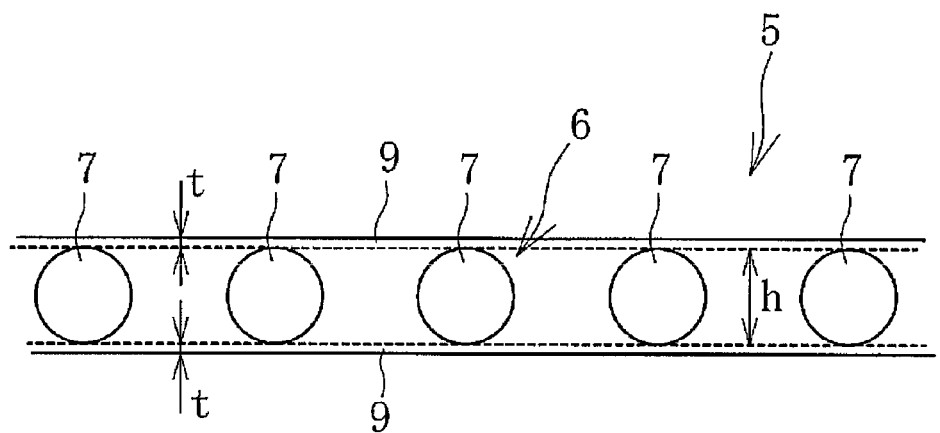
FIG. 4 is an explanatory view illustrating a reinforcing layer in a cross-sectional view crossing fiber cords at a right angle.
Figure 5:
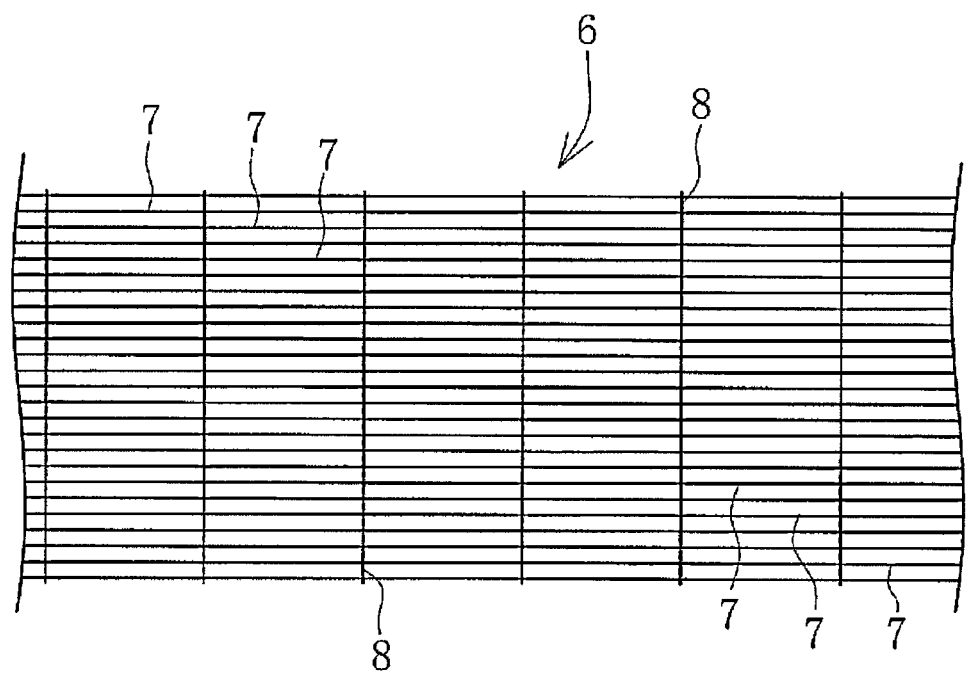
FIG. 5 is an explanatory diagram illustrating a cord fabric in a plan view.

As illustrated in FIGS. 4 and 5, each of the reinforcing layers 5 is composed of a cord fabric 6 in which a large number of fiber cords 7 are aligned and coating rubber layers 9 covering both surfaces of the cord fabric 6. The rubber of the coating rubber layers 9 is filled between the fiber cords 7. As will be described later, the cylindrical portion 3a and each of the hemispherical portions 3b are different from each other in directions in which the fiber cords 7 extend, and the cylindrical portion 3a has a bias structure and each of the hemispherical portions 3b has a radial structure.

The cord fabric 6 is joined to the coating rubber layers 9 by a predetermined adhesion treatment. This predetermined adhesion treatment is a known adhesion treatment for improving adhesiveness between the fiber cords 7 and the rubber. Specifically, after an epoxy treatment liquid is applied to the fiber cords 7 and dried, a resorcin-formalin-latex (RFL) mixed liquid is applied and dried. Conditions for the adhesion treatment (amount of each of the liquids to be attached, drying temperatures, and the like) are set in appropriate ranges in which a target adhesive force (adhesive force causing no problem in practical use) is obtained by performing a preliminary test or the like.

As illustrated in FIG. 5, in the cord fabric 6, the large number of fiber cords 7 extend in parallel, and transverse cords 8 crossing the fiber cords 7 are arranged at intervals in a direction in which the fiber cords 7 extend. A density (cord density) of the fiber cords 7 is, for example, approximately 30 cords/5 cm or more and 70 cords/5 cm or less.

Each of the transverse cords 8 extends, for example, in a direction perpendicular to the direction in which the large number of fiber cords 7 extend, with the transverse cords being interwoven above and below the fiber cords 7. The density (cord density) of the transverse cords 8 arranged adjacently is much smaller than the density of the fiber cords 7, and is, for example, approximately 2 cords/5 cm or more and 8 cords/5 cm or less.

As each of the cord fabrics 6, a cord fabric having specifications: a tensile strength F in the direction in which the fiber cords 7 extend of 4320 N/cm or more and a weight W of 950 g/m$^2$ or less is used. The tensile strength F is measured based on a tensile strength test (method A) specified in JIS L1096, and is a value obtained by dividing a breaking load of a test piece (length: 300 mm, breadth: 50 mm) of the cord fabric 6 by a breadth of the test piece. In this test, a pulling speed is 200 mm/min and a clamp interval is 200 mm. Since a known cord fabric has a tensile strength F of less than 3000 N/cm, the tensile strength F is greatly increased in this embodiment. An upper limit of the tensile strength F of the cord fabric 6 is, for example, 5500 N/cm, and a lower limit of the weight W is, for example, 700 g/m$^2$.

A bending hardness H of each of the cord fabrics 6 after the above-described predetermined adhesion treatment is 30 g/cm or less, more preferably 25 g/cm or less, and even more preferably 20 g/cm or less. A lower limit of the bending hardness H is, for example, 9 g/cm. In an embodiment of the present invention, the bending hardness H is a bending resistance as measured in accordance with a Gurley bending test method specified in JIS L1096. Specifically, the bending hardness H is calculated by multiplying a measured value X (mg/cord) obtained by measuring a test piece cut into a predetermined width from the cord fabric 6 after the predetermined adhesion treatment, with the direction in which the fiber cords 7 extend being a longitudinal direction by the cord density (cords/5 cm) of the fiber cords 7 in a unit of (g/cm). A calculation formula of the bending hardness H is as follows.

Bending hardness $H$ (g/cm)=measured value $X$ (mg/cord)×cord density (cords/5 cm)/5/1000

As illustrated in FIG. 1, in the cylindrical portion 3a, the direction in which each of the fiber cords 7 extends is inclined with respect to the cylinder axial center CL and is set at a predetermined cord angle A. A bias structure is formed in which the fiber cords 7 of each of the reinforcing layers 5 extend in an intersecting direction. In this embodiment, in each of the reinforcing layers 5 layered adjacently, the fiber cords 7 extend in the intersecting direction. Specifically, in the reinforcing layers 5 adjacent to each other, the cord angles A of the fiber cords 7 are substantially the same, and the inclination directions thereof are set in opposite directions. In every other reinforcing layer 5 among the layered reinforcing layers 5, the angles A of the fiber cords 7 are substantially the same, and the inclination directions are also set in the same direction. Therefore, the inclination directions of the fiber cords 7 of the first, third, and fifth reinforcing layers 5 from the inner peripheral side are the same, and the inclination directions of the fiber cords 7 of the second, fourth, and sixth reinforcing layers 5 from the inner peripheral side are the same.

In a neutral state where the cylindrical portion 3a is not expanded, the cord angle A of the fiber cords 7 of each of the reinforcing layers 5 is set to 25° or more and 45° or less. More preferably, the cord angle A is set to 30° or more and 35° or less.

Each of the hemispherical portions 3b has a radial structure in which a large number of fiber cords 7 extend radially around the cylinder axial center CL of the cylindrical portion 3a and the large number of fiber cords 7 extend concentrically around the cylinder axial center CL of the cylindrical portion 3a.

As the fiber cords 7, known fiber cords of polyester, nylon, or the like are used. An outer diameter of the fiber cord 7 (the height h of the cord fabric 6) is, for example, approximately 1 mm or more and 1.5 mm or less in the neutral state where the cylindrical portion 3a is not expanded.

The neutral state where the cylindrical portion 3a is not expanded is a state where tension is not substantially generated in the fiber cords 7 of the cylindrical portion 3a, and air is injected into an inside of the body 2, but internal pressure thereof is slightly higher than the atmospheric pressure (for example, 10 kPa). Furthermore, the cylindrical portion 3a retains a cylindrical shape, and the hemispherical portion 3b retains a hemispherical shape. An outer diameter of the cylindrical portion 3a in the neutral state is, for example, approximately 2 m or more and 10 m or less.

Figure 6:
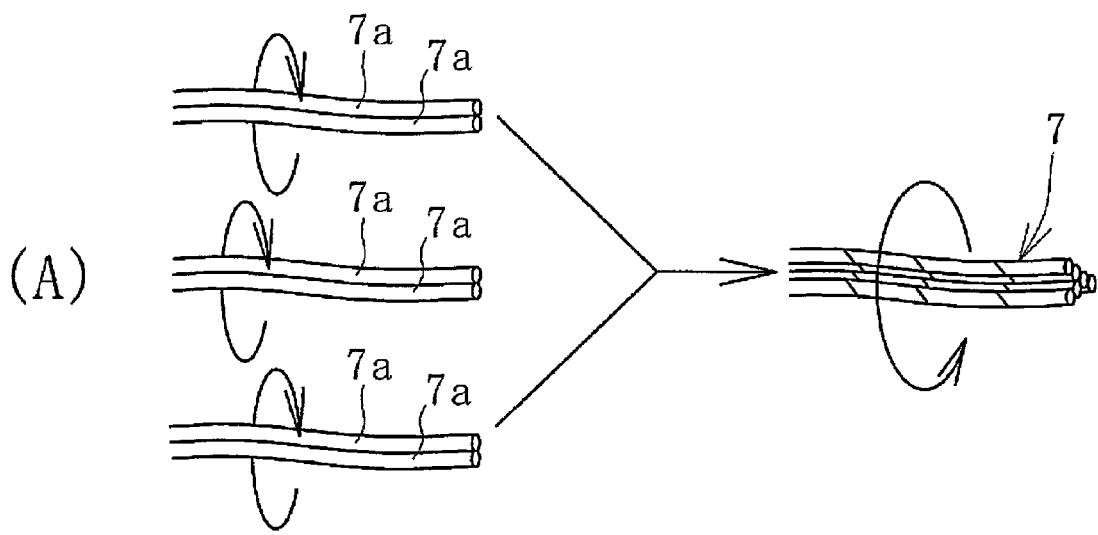
FIG. 6(A) is an explanatory diagram illustrating production steps for the fiber cord.
FIG. 6(B) is an explanatory diagram schematically illustrating the fiber cord in a transverse cross-sectional view.
Figure 6:
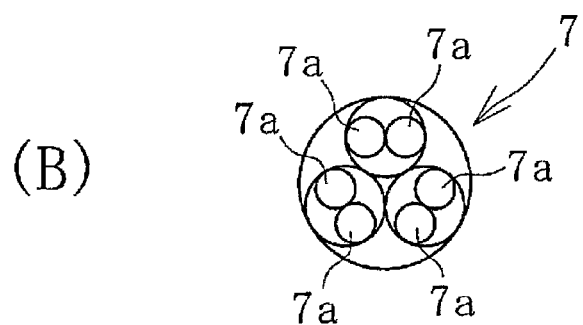

As illustrated in FIG. 6, the fiber cord 7 is a twisted cord formed by intertwining a plurality of yarns 7a. In this embodiment, the fiber cord 7 is formed by twisting a plurality of yarns 7a whose fineness is 1670 dtex. In this embodiment, the fiber cord 7 is constituted by ply-twisting two yarns 7a in the same direction, and then cable-twisting three sets of the ply-twisted two yarns 7a together in a reverse direction. That is, the fiber cord 7 has a 1670 Feb. 3 structure and a total fineness D of 10020 (=1670×6 yarns) dtex. The fiber cord 7 is not limited to this structure as long as the cord fabric 6 satisfies specifications of a weight W, the tensile strength F, and the bending hardness H described above.

Since the fiber cord 7 has a ply structure, better fatigue resistance can be obtained as compared with that obtained by a single-twisted structure. The ply twist and cable twist may have different twist counts, but, to obtain stability, the twist counts are preferably the same or approximately the same. In consideration of tensile strength, flexibility, and the like, the total fineness D of the fiber cord 7 is approximately 10000 dtex or more and 15000 dtex or less, and the number of the yarns 7a to be intertwined is approximately 4 or more and 8 or less.

A cable twist count T is preferably a twist count in which a twist coefficient K defined based on Formula (1) below is approximately 1300 or more and 2500 or less. If the twist coefficient K is less than 1300, sufficient durability is hardly ensured, and if it is more than 2500, sufficient tensile strength is hardly ensured. A specific cable twist count T is, for example, approximately 10 or more and 20 or less.

$$\text{Twist coefficient } K = T \times D^{1/2} \quad (1)$$

T: Cable twist count of fiber cord 7 (twists/10 cm)
D: Total fineness of fiber cord 7 (dtex)

In the embodiment, the transverse cords 8 have the same specifications as those of the fiber cords 7, but can also have different specifications.

The coating rubber layer 9 is formed of a known rubber, for example, natural rubber, butyl rubber, butadiene rubber, styrene-butadiene rubber, acrylonitrile-butadiene rubber, or a rubber obtained by blending a plurality of these rubbers. The reinforcing layers 5 layered adjacently are joined to each other via the coating rubber layers 9 facing each other. The innermost reinforcing layer 5 and the inner layer 4 are joined via the coating rubber layer 9 of the reinforcing layer 5. The outermost reinforcing layer 5 and the outer layer 10 are joined via the coating rubber layer 9 of the reinforcing layer 5.

A layer thickness t of each of the coating rubber layers 9 is, for example, 0.2 mm or more and 1 mm or less in the neutral state where the cylindrical portion 3a is not expanded. When the layer thickness t is less than 0.2 mm, it is difficult to ensure sufficient joining strength. When the layer thickness t exceeds 1 mm, the weight becomes excessively large and the molding processability is deteriorated. The layer thickness t is more preferably 0.2 mm or more and 0.6 mm or less.

As the rubber forming the inner layer 4, for example, natural rubber, butyl rubber, styrene-butadiene rubber, acrylonitrile-butadiene rubber, or the like is used. As the rubber forming the outer layer 10, for example, natural rubber, styrene-butadiene rubber, acrylonitrile-butadiene rubber, ethylene-propylene rubber or the like is used. In the neutral state where the cylindrical portion 3a is not expanded, the layer thickness of the inner layer 4 is, for example, approximately 2 mm or more and 5 mm or less, and the layer thickness of the outer layer 10 is, for example, approximately 3 mm or more and 12 mm or less.

Next, an example of a procedure for producing the fender 1 will be described.

Figure 2:
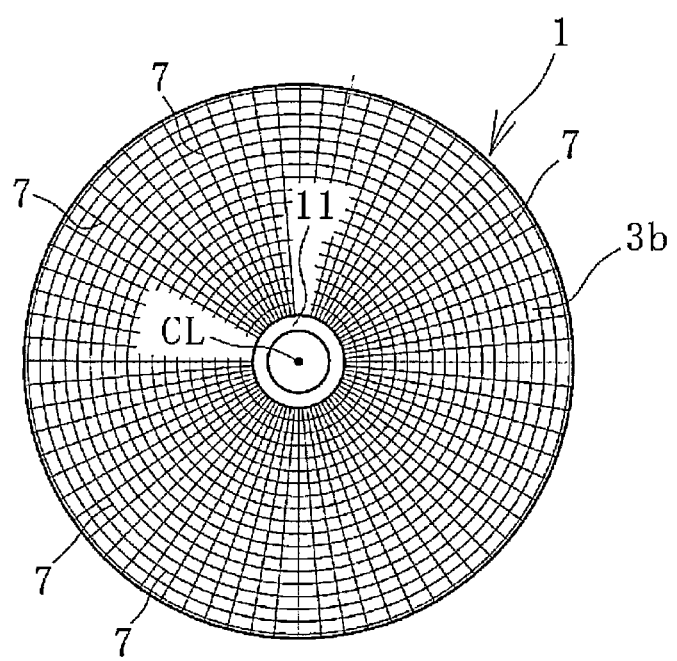
FIG. 2 is an explanatory diagram illustrating an internal structure of a hemispherical portion in FIG. 1 in a front view.
Figure 3:
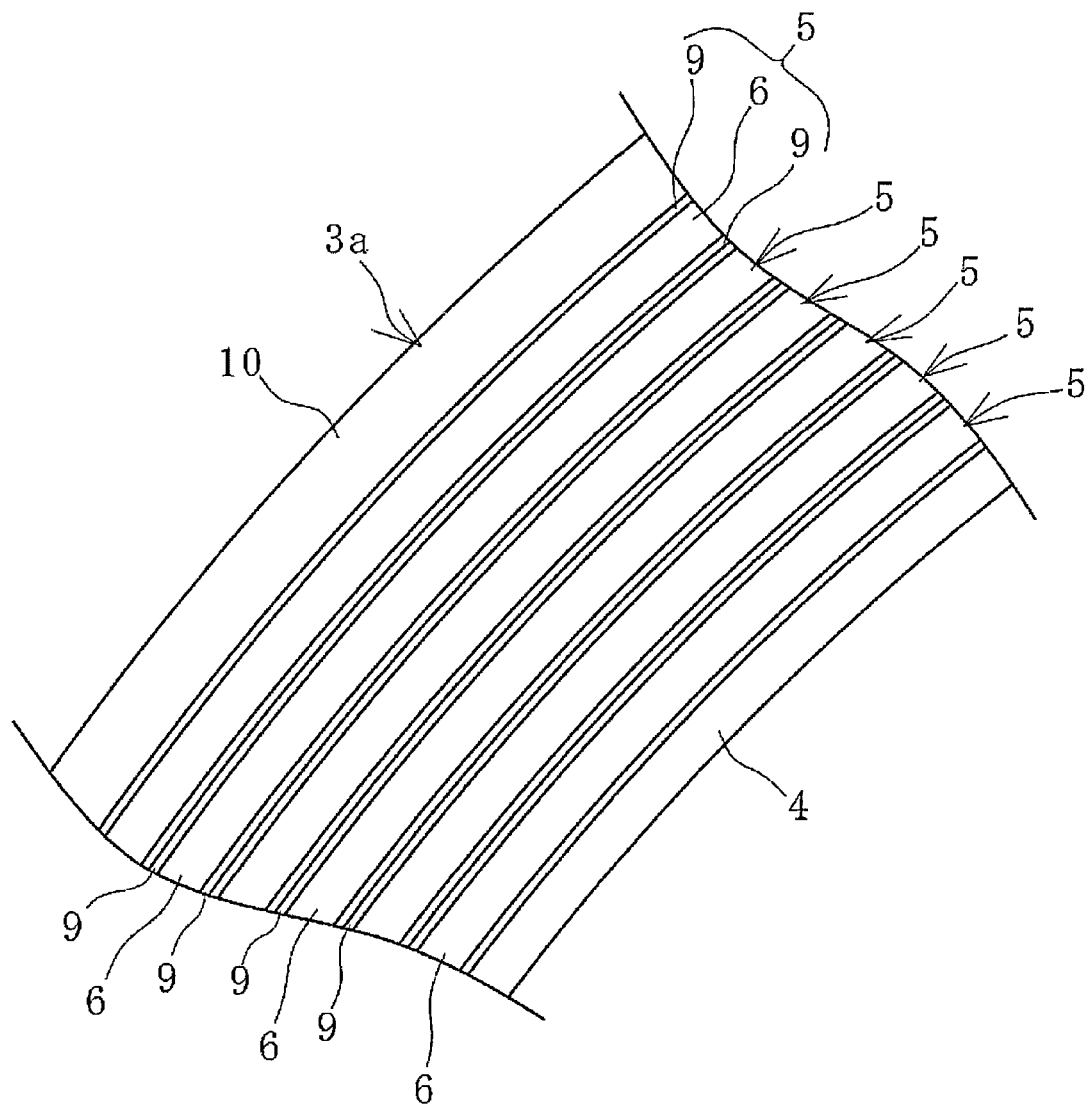
FIG. 3 is an explanatory diagram illustrating the cylindrical portion of FIG. 1 in a transverse cross-sectional view in a partially enlarged manner.

A molded body 1A having the same structure as that of the fender 1 illustrated in FIGS. 1 to 3 is molded by sequentially layering members to be the outer layer 10, the reinforcing layer 5, and the inner layer 4 inside a known molding mold. That is, a cylindrical molded body 1A in which a plurality of reinforcing layers 5 are coaxially layered between the inner layer 4 and the outer layer 10 is molded. An unvulcanized rubber is present in the molded body 1A, unlike the fender 1.

Figure 7:
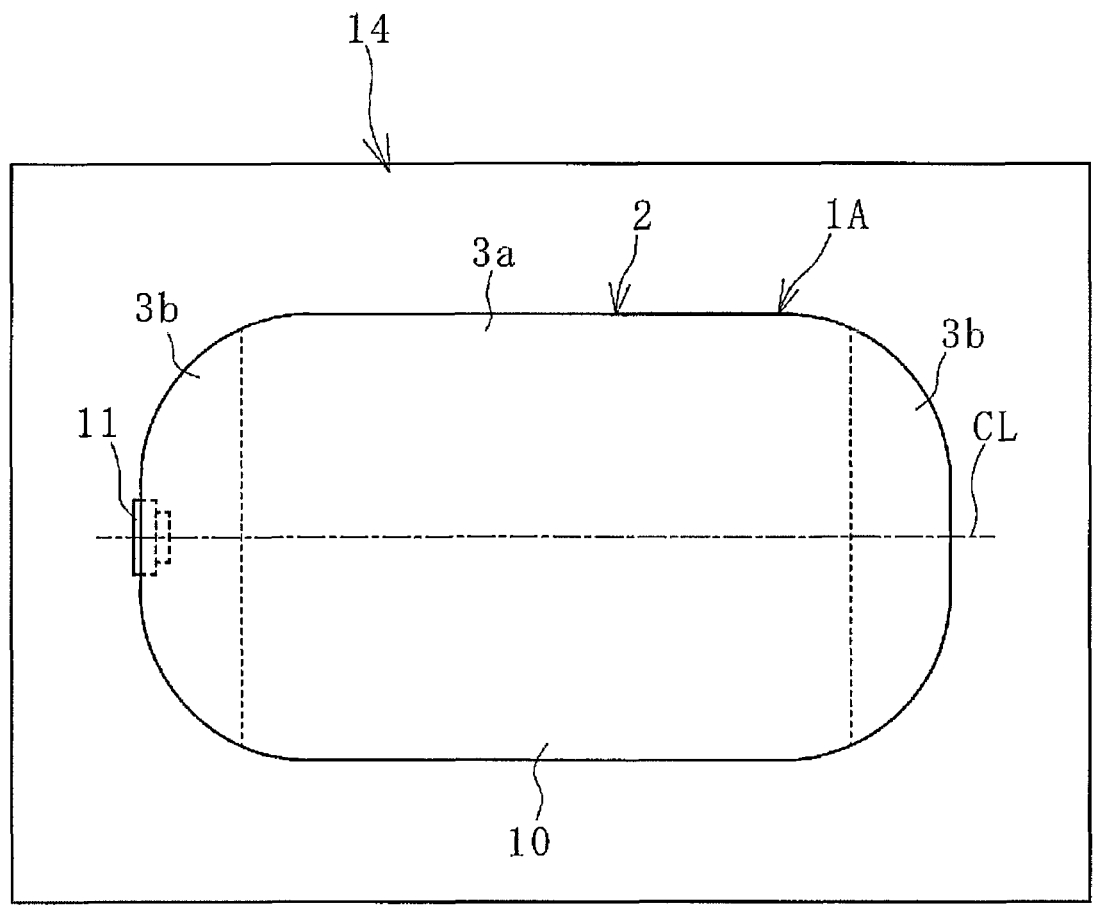
FIG. 7 is an explanatory diagram illustrating a vulcanization step for a molded body.

Next, as illustrated in FIG. 7, a molded bag-shaped molded body 1 is disposed inside a vulcanization device 14 such as a known vulcanization box. Next, the unvulcanized rubber constituting the molded body 1A is vulcanized through a vulcanization step for a predetermined time by the vulcanization device 14, and the constituent members of the molded body 1A are firmly joined and integrated with each other. As a result, the fender 1 illustrated in FIGS. 1 to 3 is produced.

When the molded body 1A is molded, a cord fabric having specifications: a tensile strength F of 4320 N/cm or more in the direction in which the fiber cords 7 extend and a weight W of 950 g/m$^2$ or less is used as each of the cord fabrics 6, as described above. The bending hardness H of the cord fabric 6 after the prescribed adhesion treatment is set to 30 g/cm or less. The bending hardness H can be adjusted by, for example, changing an amount of the RFL mixed liquid to be attached to the fiber cord 7. The layer thickness t of each coating rubber layer 9 is set to 0.2 mm or more and 1 mm or less. This layer thickness t hardly changes before and after the vulcanization step.

In the fender 1, since a cord fabric having a specification: a tensile strength F of 4320 N/cm or more in the direction in which the fiber cords 7 extend is used as each of the cord fabrics 6, sufficient pressure resistance against the internal pressure acting on the fender 1 can be easily ensured even if the number of the layered reinforcing layers 5 embedded in the cylindrical portion 3a is reduced. That is, in order to obtain the same pressure resistance, the number of the layered reinforcing layers 5 can be reduced as compared with that of a known fender. For example, in a case where a cord fabric 6 having a tensile strength F of 2500 N/cm has been used in the related art, if a cord fabric 6 having a tensile strength F of 5000 N/cm is used to obtain the same pressure resistance, the number of the layered reinforcing layers 5 can be reduced to approximately half. In the molding step for the molded body 1A, the number of operation steps increases as the number of the layered reinforcing layers 5 increases. Therefore, this embodiment is very advantageous in improving productivity while ensuring sufficient pressure resistance against the internal pressure of the fender 1.

When the weight W of each of the cord fabrics 6 is set to 950 g/m$^2$ or less and the bending hardness H after the predetermined adhesion treatment is set to 30 g/cm or less, load of operations for moving and deforming the reinforcing layer 5 is reduced in the molding step for the molded body 1A. Due to the thickness h of the cord fabric 6 (the thickness of the fiber cord 7) being increased to ensure the pressure resistance, the molding processability is reduced. However, when the weight W and the bending hardness H are in the above-described ranges, the reinforcing layer 5 is easily layered at a predetermined position and formed into a cylindrical shape, and thus the deterioration in molding processability can be suppressed.

Furthermore, by setting the layer thickness t of each of the coating rubber layers 9 to 0.2 mm or more and 1 mm or less, it becomes easy to ensure sufficient joining strength while suppressing an increase in weight. When the layer thickness t becomes large, it becomes difficult to thoroughly and sufficiently pressure-bond the reinforcing layers 5 to each other, the reinforcing layer 5 and the inner layer 4, and the reinforcing layer 5 and the outer layer 10 in the molding step for the molded body 1A, and the unvulcanized coating rubber layer 9 becomes easily deformed. The molding processability is deteriorated accordingly, but the layer thickness t is set within the above range, which becomes increasingly advantageous in ensuring pressure resistance while suppressing the deterioration in molding processability.

When the fender 1 is not used, for example, during storage, transportation, installation, or the like, the internal pressure is set to a low pressure of approximately 10 kPa, and it is brought into a neutral state where the cylindrical portion 3a is not expanded as illustrated in FIG. 1. Furthermore, the air inside the body 2 is discharged, and a folded state is attained.

Figure 8:
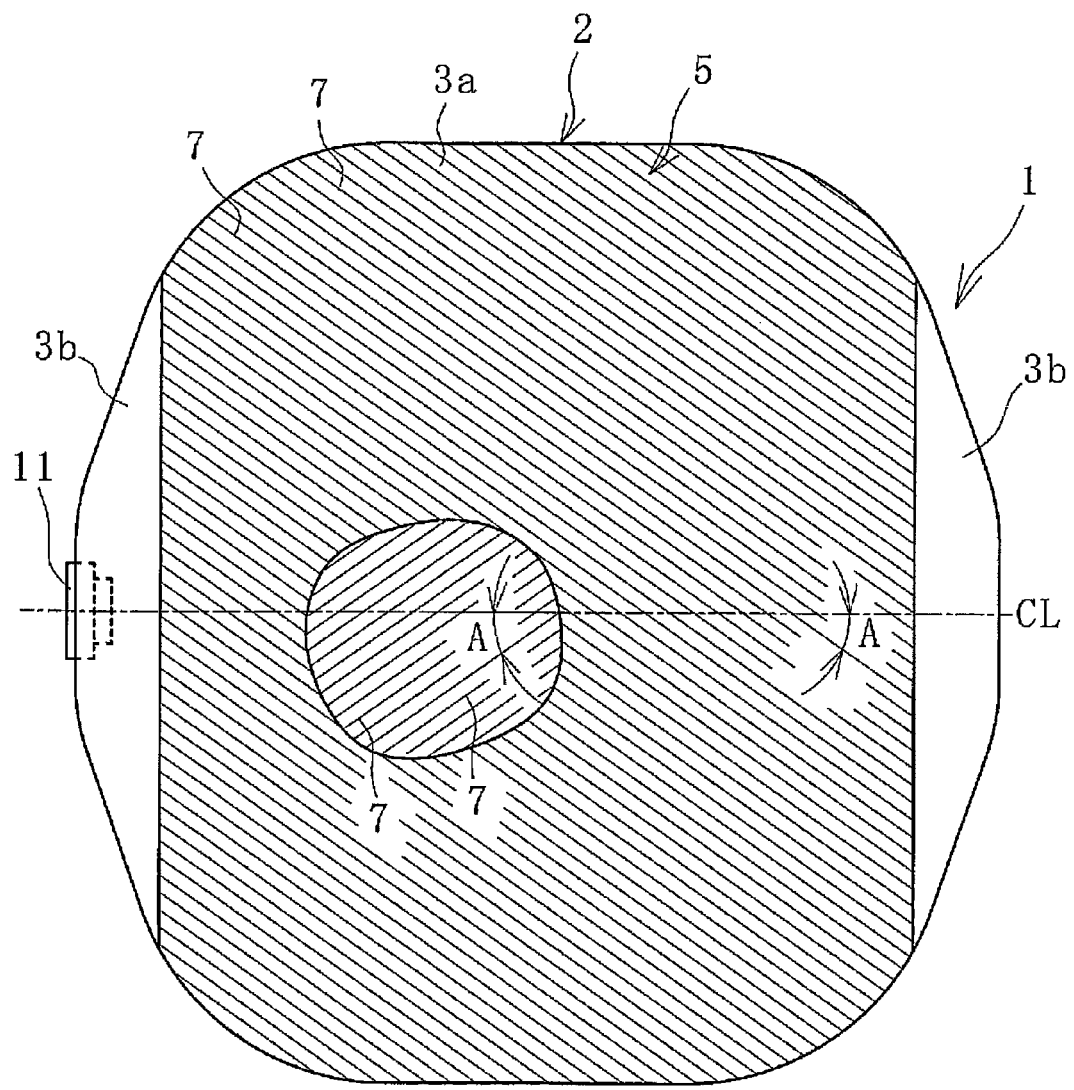
FIG. 8 is an explanatory diagram illustrating, in a side view, the pneumatic fender of FIG. 1 in which an inside of a body is pressurized to a specified internal pressure and expanded in a predetermined shape, with the cylindrical portion being partially cut away.

When the fender 1 is attached to an installation location and is used, the cylindrical portion 3a is expanded and maintained in a predetermined shape as illustrated in FIG. 8. Specifically, the inside of the body 2 is filled with air through a valve provided in the mouthpiece portion 11 and pressurized to a specified internal pressure P when the fender 1 is used. The specified internal pressure P is, for example, approximately 50 kPa or more and 100 kPa or less.

In a process of filling the inside of the body 2 with air to reach the specified internal pressure P, in the cylindrical portion 3a, the cord angle A of each of the reinforcing layers 5 will increase to approximately a stable angle of repose (from 54° to 55°). Here, between the reinforcing layers 5 (cord fabric 6) in which the fiber cords 7 extend in the intersecting directions, a shear force acts on the interposed coating rubber layer 9, and the coating rubber layer 9 is sheared and deformed.

In addition, when the cord angle A is less than 25° in the neutral state of the cylindrical portion 3a, and when the cord angle A is to be increased to approximately an angle of repose, an excessively large shear stress is generated in the coating rubber layer 9, which is not preferable. Therefore, the cord angle A is set to 25° or more, and more preferably 30° or more. When the cord angle A is more than 45°, the degree of diameter expansion of the cylindrical portion 3a when the cylindrical portion 3a is pressurized to the specified internal pressure P from the neutral state is reduced. Therefore, the cord angle A is set to 45° or less, and more preferably 35° or less.

When pressurized to the specified internal pressure P, the cylindrical portion 3a can have the outer diameter of approximately 120% or more and 150% or less with respect to that in the neutral state. An axial length of the body 2 (the cylindrical portion 3a) is approximately from 95% to 80% with respect to the neutral state when it is pressurized to the specified internal pressure P.

If the layer thickness t of the coating rubber layer 9 is less than 0.2 mm, the load on the coating rubber layer 9, on which the shear force acts when the cylindrical portion 3a expands, becomes excessively large. When the layer thickness t of the coating rubber layer 9 is 1 mm or more, the weight of the fender 1 becomes excessively large. Therefore, the layer thickness t of each of the coating rubber layers 9 is preferably 0.2 mm or more and 1 mm or less.

Figure 9:
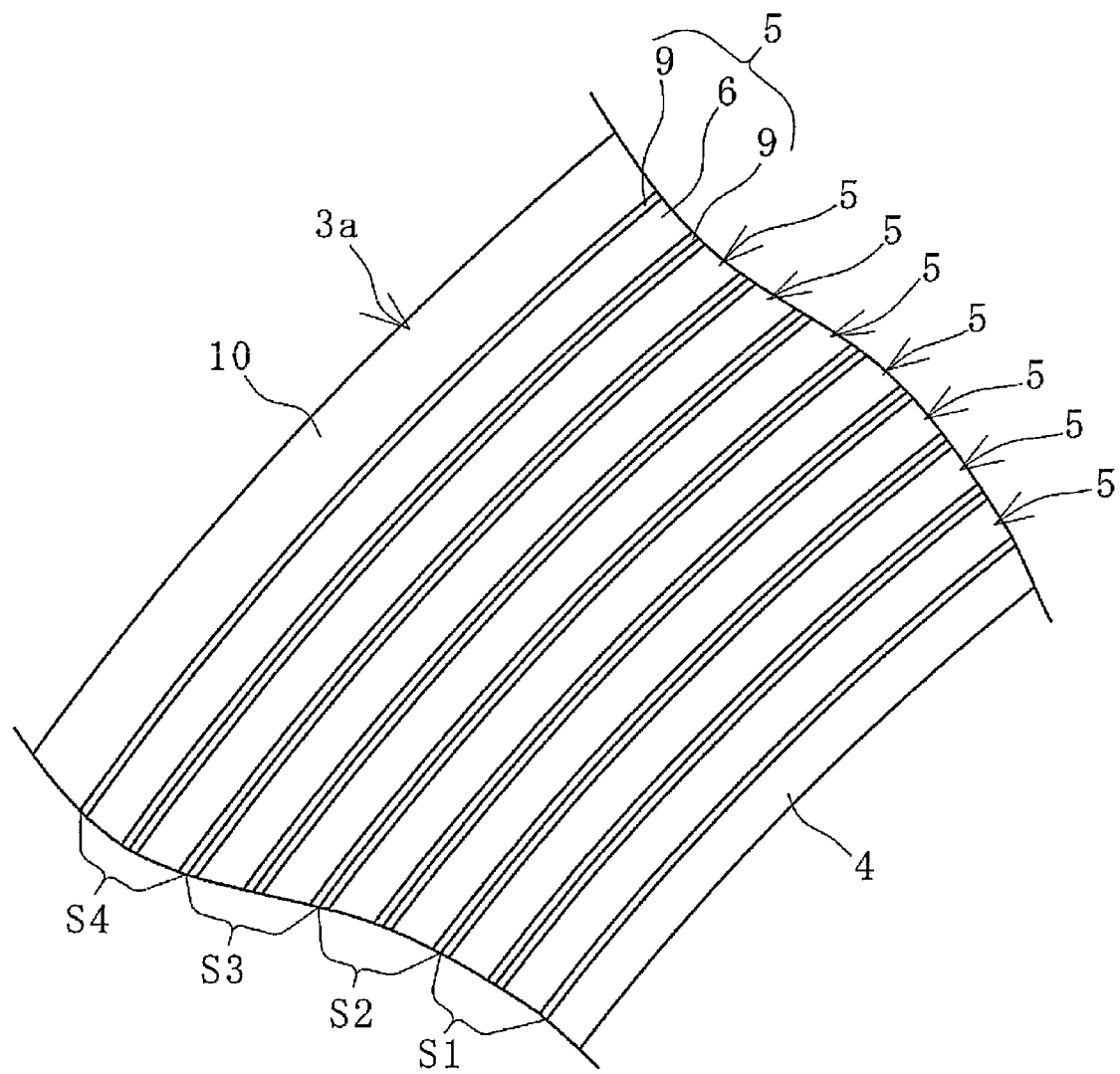
FIG. 9 is an explanatory diagram illustrating a modified example of the cylindrical portion in a transverse cross-sectional view in a partially enlarged manner.

The fender 1 illustrated in FIG. 9 has a plurality of sets S, each set S (S1 to S4) including two reinforcing layers 5 layered adjacently. In this embodiment, the fender 1 includes eight reinforcing layers 5 layered in the cylindrical portion 3a and has four sets S. The respective sets S are composed of different reinforcing layers 5. The number of sets S is, for example, approximately from 3 to 6 and is preferably plural.

In each of the sets S of the reinforcing layers 5, the fiber cords 7 of each of the reinforcing layers 5 extend in the same direction at a predetermined cord angle A. In each of the sets S layered adjacently, the fiber cords 7 of the reinforcing layers 5 extend in the intersecting direction at a predetermined cord angle A. In other words, the fiber cords 7 of the reinforcing layers 5 in the sets S1 and S2 extend in the intersecting direction, the fiber cords 7 of the reinforcing layers 5 in the sets S2 and S3 extend in the intersecting direction, and the fiber cords 7 of the reinforcing layers 5 in the sets S3 and S4 extend in the intersecting direction. Thus, the fiber cords 7 of the reinforcing layers 5 in the sets S1 and S3 extend in parallel, and the fiber cords 7 of the reinforcing layers 5 in the sets S2 and S4 extend in parallel. In other words, in the cylindrical portion 3a, the fiber cords 7 have a bias structure with the set S as a unit. When the fender 1 is produced, a molded body 1A having the same structure as the structure illustrated in FIG. 9 has only to be molded.

In this fender 1, in the process of filling the inside of the body 2 with air to reach the specified internal pressure P, the cord angle A of the fiber cords 7 of each of the reinforcing layers 5, in the cylindrical portion 3a, will increase to approximately the stable angle of repose (from 54° to 55°). Here, in each of the sets S, the fiber cords 7 of each of the reinforcing layers 5 extend in the same direction at a predetermined cord angle A. Therefore, a shear force does not substantially act on the coating rubber layer 9 interposed between the reinforcing layers 5 (cord fabrics 6).

On the other hand, the fiber cords 7 of the reinforcing layers 5 of the sets S layered adjacently in the cylindrical portion 3a extend in the intersecting direction. Therefore, a shear force acts on the coating rubber layer 9 interposed between the sets S, and the coating rubber layer 9 is sheared and deformed. In this manner, when the cylindrical portion 3a is pressurized to the specified internal pressure P from the neutral state, the cord angle A of the fiber cords 7 of each of the reinforcing layers 5 in the cylindrical portion 3a increases to approximately the stable angle of repose (from 54° to 55°), and the cylindrical portion 3a expands and is maintained in a predetermined shape.

Specifically, when the cylindrical portion 3a expands, a shear force acts substantially only on the coating rubber layer 9 interposed between the sets S layered adjacently. Therefore, as compared with a case where a shear force acts on all of the coating rubber layers 9, the resistance when expanding the cylindrical portion 3a is reduced, which is advantageous in smoothly expanding the cylindrical portion 3a.

Figure 10:
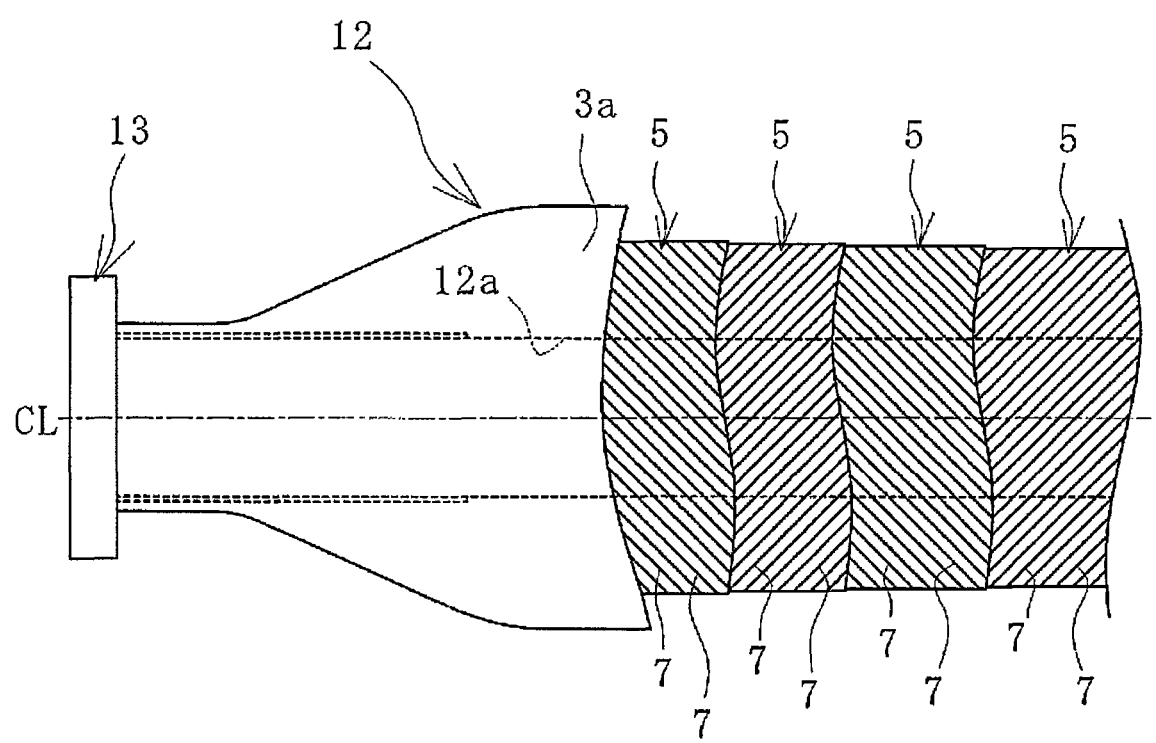
FIG. 10 is an explanatory diagram illustrating, in a side view, a marine hose as an embodiment of the rubber product, with a cylindrical portion being partially cut away.
Figure 11:
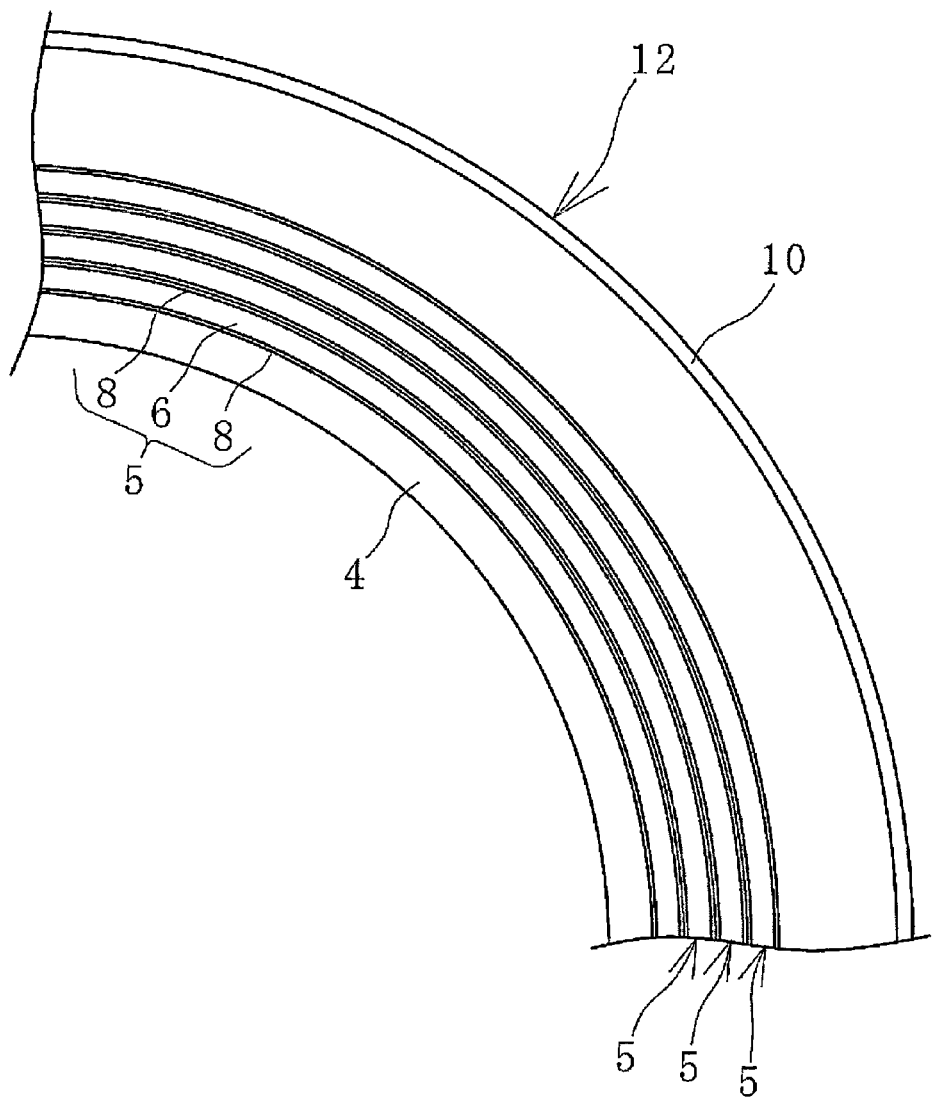
FIG. 11 is an explanatory diagram illustrating a part of the cylindrical portion of FIG. 10 in a transverse cross-sectional view.

The embodiment of the rubber product is not limited to the fender 1, and may be a marine hose 12 as illustrated in FIGS. 10 and 11. The marine hose 12 includes flange portions 13 at both end portions in the longitudinal direction, and a cylindrical portion 3a extends between the flange portions 13. In the cylindrical portion 3a, a plurality of reinforcing layers 5 are coaxially layered and embedded between an inner layer 4 and an outer layer 10. Specifications of each of the reinforcing layers 5 are the same as those of the embodiment described above. In the marine hose 12, an inner peripheral side region of the inner layer 4 serves as a flow path 12a. In a floating type marine hose 12, a buoyant layer is provided between the outer layer 10 and the reinforcing layer 5.

The marine hose 12 can be produced by molding a cylindrical molded body by a known method using the above-described members and vulcanizing the molded body by a known method. Also in this marine hose 12, as in the embodiment of the fender 1, even if the number of the layered reinforcing layers 5 embedded in the cylindrical portion 3a is reduced, it is easy to ensure sufficient pressure resistance against internal pressure, which is advantageous in improving producibility of the marine hose 12. It is advantageous in suppressing a deterioration in molding processability in producing the marine hose 12.

EXAMPLES

As shown in Table 1, eight types of cord fabrics having different specifications (Known Example, Examples 1 to 5, and Comparative Examples 1 to 3) were prepared, subjected to the above-described predetermined adhesion treatment, and then coated with coating rubber layers on both their surfaces to produce reinforcing layers. Each of the fiber cords 7 has a ply structure in which the ply twist count is the same as the cable twist count T. The tensile strength F in the direction in which the fiber cords 7 extended was measured for each cord fabric, and the bending hardness H was measured for each cord fabric after the predetermined adhesion treatment. For the produced reinforcing layers, fatigue resistance was evaluated using test pieces prepared by vulcanization under the same conditions, as follows. The measurement results and evaluation results are as shown in Table 1.

TABLE 1

|  |  |  | Known Example | Example | | | | | Comparative Example | | |
| --- | --- | --- | --- | --- | --- | --- | --- | --- | --- | --- | --- |
|  |  |  |  | 1 | 2 | 3 | 4 | 5 | 1 | 2 | 3 |
| Cord fabric | Fiber cord | Material | | | | | Polyester | | | | |
|  |  | Structure | 1670/1/3 | | | | 1670/2/3 | | | | |
|  |  | Total fineness D (dtex) | 5010 | | | | 10020 | | | | |
|  |  | Number of yarns | 3 | | | | 6 | | | | |
|  |  | Cable twist count T (twists/10 cm) | 24 | | 17 | | 13 | | | 17 | |
|  |  | Twist coefficient K | 1699 | | 1702 | | 1301 | | | 1702 | |
|  | Density (cords/5 cm) | | 48 | 36 | 32 | 40 | 36 | | 30 | 42 | 36 |
|  | Weight W (g/m²) | | 585 | 837 | 744 | 930 | 803 | 818 | 698 | 977 | 841 |
|  | Thickness h (mm) | | 0.85 | | 1.17 | | 1.15 | 1.19 | 1.20 | | 1.18 |
|  | Tensile strength F (N/cm) | | 2880 | 4954 | 4410 | 5520 | 5335 | 5200 | 4062 | 5754 | 4680 |
|  | Bending hardness H (g/cm) after adhesion treatment | | 11.4 | 18.8 | 16.7 | 20.9 | 9.7 | 25.1 | 15.7 | 21.9 | 31.5 |

TABLE 1-continued

|  |  | Known Example | Example 1 | Example 2 | Example 3 | Example 4 | Example 5 | Comparative Example 1 | Comparative Example 2 | Comparative Example 3 |
|---|---|---|---|---|---|---|---|---|---|---|
| Coating rubber layer | Material | NR/SBR/BR | | | | | | | | |
|  | Layer thickness t (mm) | 0.2 | 0.2 | 0.2 | 0.2 | 0.2 | 0.2 | 0.2 | 0.2 | 1.1 |
| Reinforcing layer | Pressure resistance | X | ○ | ○ | ○ | ○ | ○ | X | ○ | ○ |
|  | Molding processability | ○ | ◎ | ◎ | ◎ | ◎ | ○ | ◎ | X | X |
|  | Fatigue resistance (%) | 75 | 86 | 85 | 86 | 80 | 74 | 88 | 85 | 58 |

[Fatigue Resistance Test]

The fatigue resistance was evaluated by the disc fatigue strength (Goodrich method) specified in 2.2.2 of JIS L1017 (2002) appendix 1. A test piece prepared from the vulcanized reinforcing layer was subjected to a fatigue test in which the test piece was rotated at a strain of +10% at a rotation speed of 2400 rpm for 24 hours at room temperature. After the fatigue test, the fiber cord was taken out from the test piece, the tensile strength was measured, and a retention thereof to the tensile strength before the fatigue test was calculated. A high value of the retention indicates superior fatigue resistance.

With respect to the pressure resistance in Table 1, the pressure resistance is indicated by x because it is evaluated to be difficult to ensure sufficient pressure resistance per reinforcing layer when the tensile strength F is less than 4100 N/cm, and is indicated by ○ because it is evaluated to be possible to ensure sufficient pressure resistance per reinforcing layer when the tensile strength is 4100 N/cm or more. For the molding processability of Table 1, an unvulcanized reinforcing layer having a predetermined width was pasted to a molding drum having a predetermined outer diameter, and the ease of pasting and the degree of deformation of the coating rubber layer after pasting are evaluated. When the pasting operation could be very smoothly performed and the deformation of the coating rubber layer was also small, the molding processability was evaluated to be excellent and indicated by ◎. When the pasting operation could be performed substantially without any problem and the deformation of the coating rubber layer was at a level causing no problem in practical use, the molding processability was evaluated to be substantially good and indicated by ○. When the pasting operation and/or the deformation of the coating rubber layer are/is at a level causing a problem in practical use, the molding processability is evaluated to be poor and indicated by x. That is, the rank of excellent molding processability is in a descending order of ◎, ○, and X.

The results of Table 1 show that the reinforcing layers corresponding to Examples 1 to 5 have excellent pressure resistance and also have good molding processability. The results show that the reinforcing layers corresponding to Examples 1 to 5 have fatigue resistance equal to or higher than that of Known Example and have good fatigue resistance.

REFERENCE SIGNS LIST

1 Pneumatic fender
1A Molded body
2 Body
3a Cylindrical portion
3b Hemispherical portion
4 Inner layer
5 Reinforcing layer
6 Cord fabric
7 Fiber cord
7a Yarn
8 Transverse cord
9 Coating rubber layer
10 Outer layer
11 Mouthpiece portion
12 Marine hose
12a Flow path
13 Flange portion
14 Vulcanization device
A Cord angle
S (S1, S2, S3, S4) Set of reinforcing layers

The invention claimed is:

1. A rubber product including a cylindrical portion in which a plurality of reinforcing layers are coaxially layered and embedded between an inner layer and an outer layer, each of the reinforcing layers being composed of cord fabrics that include a plurality of fiber cords aligned in a density of 30 cords/5 cm or more and 70 cords/5 cm or less, transverse cords crossing the fiber cords are arranged at intervals in a direction in which the fiber cords extend and are subjected to an adhesion treatment and coating rubber layers covering both surfaces of the cord fabric, and having a bias structure in which the fiber cords of adjacently layered ones of the reinforcing layers intersect and extend;
  each of the cord fabrics having specifications: a tensile strength of 4320 N/cm or more relative to an extension direction of the fiber cords comprising the cord fabric and a weight of 950 g/m$^2$ or less being used,
  each of the cord fabrics having a bending hardness of 30 g/cm or less after the adhesion treatment, and
  each of the coating rubber layers having a layer thickness of 0.2 mm or more and 1 mm or less in a neutral state where the cylindrical portion is not expanded.

2. The rubber product according to claim 1, wherein the rubber product is a pneumatic fender or a marine hose.

3. The rubber product according to claim 1, wherein
  the rubber product is a pneumatic fender,
  a cord angle of each of the fiber cords with respect to a cylinder axial direction of the cylindrical portion is set to 25° or more and 45° or less in the neutral state where the cylindrical portion is not expanded, and
  in a state where a specified internal pressure during use of the rubber product acts on the cylindrical portion, the cord angle of each of the fiber cords becomes 54° or more and 55° or less, and the cylindrical portion is expanded and deformed.

4. The rubber product according to claim 1, wherein a layer thickness of each of the coating rubber layers is 0.6 mm or less.

5. The rubber product according to claim 1, wherein the fiber cords are twisted cords formed by intertwining 4 or more and 8 or less yarns and the total fineness of the fiber cords is 10000 dtex or more and 15000 dtex or less.

6. A method of producing a rubber product including molding a molded body having a cylindrical shape in which a plurality of reinforcing layers are coaxially layered between an inner layer and an outer layer, composing each of the reinforcing layers of cord fabrics that include a plurality of fiber cords aligned in a density of 30 cords/5 cm or more and 70 cords/5 cm or less and are subjected to an adhesion treatment and coating rubber layers covering both surfaces of the cord fabric, forming a bias structure in which the fiber cords of adjacently layered ones of the reinforcing layers intersect and extend, and producing, by vulcanizing the molded body, a rubber product including a cylindrical portion in which the plurality of reinforcing layers are coaxially layered and embedded between the inner layer and the outer layer, the method comprising:
using each of the cord fabrics having specifications: a tensile strength of 4320 N/cm or more relative to an extension direction of the fiber cords comprising the cord fabric and a weight of 950 $g/m^2$ or less,
making each of the cord fabrics have a bending hardness of 30 g/cm or less after the adhesion treatment; and
making each of the coating rubber layers have a layer thickness of 0.2 mm or more and 1 mm or less.

7. The method of producing a rubber product according to claim 6, wherein a layer thickness of each of the coating rubber layers is 0.6 mm or less.

8. The method of producing a rubber product according to claim 6, wherein the fiber cords are twisted cords formed by intertwining 4 or more and 8 or less yarns and the total fineness of the fiber cords is 10000 dtex or more and 15000 dtex or less.

* * * * *